C. ARNOUX.
Car Truck.
No. 39,332.
Patented July 28, 1863.
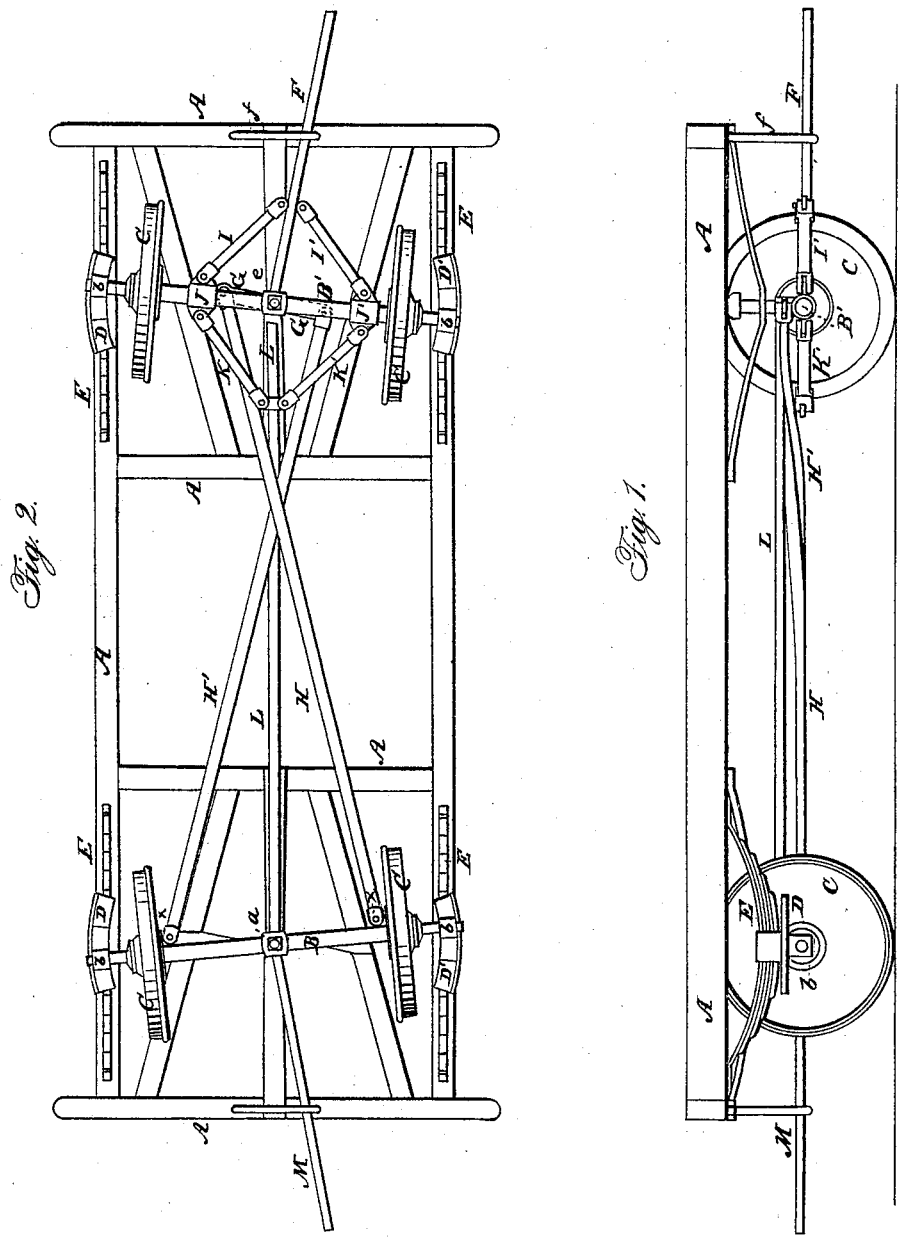
Witnesses:
Inventor:

UNITED STATES PATENT OFFICE.

CLAUDE ARNOUX, OF PARIS, FRANCE.

IMPROVED TRACTION AND CONNECTING APPARATUS FOR RAILROAD-TRAINS.

Specification forming part of Letters Patent No. 39,332, dated July 28, 1863.

*To all whom it may concern:*

Be it known that I, CLAUDE ARNOUX, of Paris, in the Empire of France, have invented an Improvement in Traction and Connecting Apparatus for Railway-Cars; and I do hereby declare the following to be a full, clear, and exact description of the same, reference being had to the accompanying drawings, and to the letters of reference marked thereon.

My invention consists of certain novel mechanism, described hereinafter, as applied to railway-cars, whereby the axles and wheels of each car of a train will readily accommodate themselves to the most abrupt curves of the track.

In order to enable others to make and use my invention, I will now proceed to describe its construction and operation.

On reference to the accompanying drawings, which form a part of this specification, Figure 1 is a side view, partly in section, of sufficient of a railway-car to illustrate my invention; and Fig. 2 is an inverted plan view of Fig. 1.

A represents the frame of the car, B being the rear axle, and B' the front axle. The rear axle, B, is hung at a point midway between its opposite ends to a central pin, $a$, attached to the frame of the car, the axle being furnished with the usual flanged wheels, C C, and the journals turning in boxes $b$ $b$, one of which is arranged to slide freely on a segmental plate, D, situated on one side of the frame, the other being arranged to slide on a similar plate, D', situated on the opposite side of the frame, and each plate being secured to the under side of an ordinary elliptical spring, E. The front axle, B', is also hung to a central pin, $e$, secured to the frame of the car, the axle being furnished with the usual flanged wheels, C C, and the journals turning in boxes $b$, arranged to slide in plates D and D', secured to elliptical springs, as described in reference to the rear axle, B.

F is the front draw-bar, which is permitted to have a vibrating movement to a limited extent in a hanger, $f$, secured to the frame. Forming part of this draw-bar, or secured to the same, is the lever G, which is hung midway between its opposite ends to the central pin, $e$, on which the front axle, B', turns. One arm of this lever G is connected by a diagonal rod, H, to the rear axle, B, at the point $x$, the other arm of the lever being connected by a similar diagonal rod, H', to the same axle at a point, $x'$, the two points $x$ and $x'$ being situated one near one flanged wheel C, and the other near the opposite flanged wheel C, of the said axle B.

To one side of the draw-bar F is jointed one end of a rod, I, and to the opposite side of the draw-bar is jointed one end of a similar rod, I', the rod I being jointed to a sleeve, J, which is arranged to slide on the axle B', and the rod I' being jointed to a sleeve, J', which is arranged to slide on the same axle, one sleeve being situated on one side, and the other on the opposite side, of the center pin, $e$, on which the axle turns. The sleeve J is connected by a rod, K, to a rod, L, which extends from the central pin, $a$, of the rear axle to the central pin, $e$, of the front axle. In like manner the sleeve J' is connected by a rod, K', to the same rod L. As soon as the advance car, to which the car described is connected by the draw-bar F, commences to turn a curve in the road, the said draw-bar will be turned on one side, thereby turning the axle B' through the medium of the rods I and I' and K and K' and sleeves J and J' to a position best adapted to the curve, and at the same time through the medium of the lever G and diagonal rods H and H', turning the rear axle in a contrary direction, but to a position adapted to the curve. It should be understood that the rear draw-bar, M, is connected to the rear axle, B, so that one may move with the other. Without further description it will be seen that the whole of the axles and wheels of a train of cars, each car being provided with the appliances described, will, on turning a curve, even of the most abrupt character, readily and certainly accommodate themselves to that curve.

It will be evident that the arrangement of rods and levers may be modified to a considerable extent without departing from the main feature of my invention.

I therefore claim as my invention and desire to secure by Letters Patent—

The draw-bar F, when arranged to turn the front and rear axles of the car through the medium of the rods I and I', sleeves J and J', lever G, rods K and K', and rods H and H', or a system of rods and levers equivalent to the same, substantially as and for the purpose herein set forth.

In testimony whereof I have signed my name to this specification before two subscribing witnesses.

C. ARNOUX.

Witnesses:
ARNOLD A. LAMM,
JAMES W. BROOKS.